(12) United States Patent
Higuchi et al.

(10) Patent No.: US 7,950,282 B2
(45) Date of Patent: May 31, 2011

(54) ACCELERATION SENSOR INCORPORATING A PIEZOELECTRIC DEVICE

(75) Inventors: Takamitsu Higuchi, Matsumoto (JP); Yasuhiro Ono, Suwa (JP)

(73) Assignee: Seiko Epson Corporation (JP)

( * ) Notice: Subject to any disclaimer, the term of this patent is extended or adjusted under 35 U.S.C. 154(b) by 562 days.

(21) Appl. No.: 12/053,011

(22) Filed: Mar. 21, 2008

(65) Prior Publication Data
US 2008/0229826 A1 Sep. 25, 2008

(30) Foreign Application Priority Data

Mar. 23, 2007 (JP) .................................. 2007-076902

(51) Int. Cl.
*G01P 15/09* (2006.01)
(52) U.S. Cl. .................................. 73/514.34; 73/514.29
(58) Field of Classification Search ............... 73/514.34, 73/514.29, 514.16, 514.32, 514.33, 493; 310/370
See application file for complete search history.

(56) References Cited

U.S. PATENT DOCUMENTS

| | | | | |
|---|---|---|---|---|
| 4,035,673 A | * | 7/1977 | Ishida et al. ................ | 310/344 |
| 4,479,385 A | * | 10/1984 | Koehler ................ | 73/514.29 |
| 5,063,782 A | * | 11/1991 | Kellett ................ | 73/514.34 |
| 5,415,039 A | * | 5/1995 | Nakamura ................ | 73/514.29 |
| 6,627,965 B1 | * | 9/2003 | Tuller et al. ................ | 257/415 |
| 6,953,977 B2 | * | 10/2005 | Mlcak et al. ................ | 257/414 |
| 7,002,284 B2 | | 2/2006 | Ouchi et al. | |
| 7,067,966 B2 | * | 6/2006 | Tanaya ................ | 310/367 |
| 7,083,270 B2 | * | 8/2006 | Torii et al. ................ | 347/68 |
| 7,134,339 B2 | * | 11/2006 | Mikado et al. ................ | 73/514.29 |
| 7,260,990 B2 | * | 8/2007 | Ohuchi et al. ................ | 73/504.12 |
| 7,536,910 B2 | * | 5/2009 | Watanabe ................ | 73/504.12 |

FOREIGN PATENT DOCUMENTS

| | | |
|---|---|---|
| JP | 02-248865 | 10/1990 |
| JP | 05-026902 | 2/1993 |
| JP | 10-318755 | 12/1998 |
| JP | 2001-133476 | 5/2001 |
| JP | 2003-142695 | 5/2003 |
| JP | 2003-227719 | 8/2003 |
| JP | 2005-291858 | 10/2005 |
| JP | 2006-029992 | 2/2006 |

\* cited by examiner

*Primary Examiner* — Helen C. Kwok
(74) *Attorney, Agent, or Firm* — Harness, Dickey & Pierce, P.L.C.

(57) ABSTRACT

An acceleration sensor includes: a piezoelectric vibration device; an oscillation circuit; and a detection circuit, wherein the piezoelectric vibration device includes a substrate, an insulation layer formed above the substrate, a vibration section forming layer formed above the insulation layer, a vibration section formed in a cantilever shape in a first opening section that penetrates the vibration section forming layer and having a base section affixed to the vibration section forming layer and two beam sections extending from the base section, a second opening section that penetrates the insulation layer and formed below the first opening section and the vibration section, and a piezoelectric element section formed on each of the beam sections; the oscillation circuit vibrates the piezoelectric vibration device at a resonance frequency; and the detection circuit detects a change in the frequency of vibrations of the piezoelectric vibration device which is caused by an acceleration applied in a direction in which the beam sections extend, and outputs a signal corresponding to the acceleration based on the change in the frequency.

4 Claims, 3 Drawing Sheets

ACCELERATION SENSOR INCORPORATING A PIEZOELECTRIC DEVICE

The entire disclosure of Japanese Patent Application No. 2007-076902, filed Mar. 23, 2007 is expressly incorporated by reference herein.

BACKGROUND

1. Technical Field

The present invention relates to angular rate sensors and electronic devices.

2. Related Art

Installation of acceleration sensors (accelerometers) on information equipment including digital cameras and hard disks and on automotive equipment including antilock brakes and air-bag systems has started. An acceleration sensor detects acceleration generated by vibrations and operations of equipment on which the acceleration sensor is mounted. As acceleration sensors, a strain-resistance type (see, for example, JP-A-2006-029992), and an electrostatic capacitance type (see, for example, JP-A-05-026902) have been proposed. Above all, vibration type acceleration sensors using oscillators are being extensively developed as they achieve higher sensitivity than other types.

However, crystal oscillators have been used in vibration type acceleration sensors in prior art. In the case of a tuning-fork shaped quartz oscillator, for obtaining a 32 kHz resonance frequency, the length of the prongs of the tuning fork becomes as large as several millimeters, whereby the entire length including the package becomes as large as almost 10 mm. Also, piezoelectric vibration devices that use a silicon substrate, instead of quartz, have been developed (see, for example, JP-A-2005-291858) in an attempt to achieve further size-reduction. When utilizing such piezoelectric vibration devices, since the thickness of a silicon substrate can only be reduced to about 100 µm, the prong length of the beams may become as much as several millimeters or greater in order to obtain a resonance frequency at several tens kHz. Therefore, further technological developments are necessary to reduce the size of the acceleration sensors.

SUMMARY

In accordance with an aspect of the present invention, there is provided an acceleration sensor having a piezoelectric vibration device that can be reduced in size, can be driven at a desired resonance frequency, and can obtain a high Q value. In accordance with another aspect of the present invention, an electronic device having the aforementioned acceleration sensor can be provided.

An acceleration sensor in accordance with an embodiment of the invention includes:
a piezoelectric vibration device;
an oscillation circuit; and
a detection circuit,
wherein
the piezoelectric vibration device includes a substrate, an insulation layer formed above the substrate, a vibration section forming layer formed above the insulation layer, a tuning-fork shaped vibration section formed in a cantilever shape in a first opening section that penetrates the vibration section forming layer and having a base section affixed to the vibration section forming layer and two beam sections extending from the base section, a second opening section that penetrates the insulation layer and formed below the first opening section and the vibration section, and a piezoelectric element section formed on each of the beam sections, the oscillation circuit vibrates the piezoelectric vibration device at a resonance frequency, and the detection circuit detects a change in the frequency of vibration of the piezoelectric vibration device which is caused by an acceleration applied in a direction in which the beam sections extend, and outputs a signal corresponding to the acceleration based on the change in the frequency.

According to the piezoelectric vibration device of the acceleration sensor in accordance with the present embodiment, its resonance frequency depends on the width of the beam of the vibration section. Therefore, according to the piezoelectric vibration device, its resonance frequency can be adjusted by adjusting the width of the beam without making the vibration section longer. According to the piezoelectric vibration device, the resonance frequency can be lowered by narrowing the width of the beams of the vibration section. In other words, according to the acceleration sensor in accordance with the present embodiment having the piezoelectric vibration device, the width of the beam of the vibration section may be made narrower by using the semiconductor process, whereby the acceleration sensor can be made smaller in size than other acceleration sensors in prior art, and can be driven at a desired resonance frequency (for example, at several tens kHz). Also, according to the piezoelectric vibration device of the acceleration sensor in accordance with the embodiment of the invention, stress does not concentrate in a boundary section between the vibration section and the vibration section forming layer (more specifically, at the fixed end of the vibration section), such that a high Q value can be obtained.

It is noted that, in the descriptions concerning the invention, the term "above" may be used, for example, as "a specific element (hereafter referred to as "A") is formed 'above' another specific element (hereafter referred to as "B")." In the descriptions concerning the invention, in this case, the term "above" is used, assuming that it include a case in which A is formed directly on B, and a case in which A is formed above B through another element.

In the acceleration sensor in accordance with an aspect of the invention, the piezoelectric element section may include a pair of piezoelectric elements.

In the acceleration sensor in accordance with an aspect of the invention, the piezoelectric element may be formed from a lower electrode, a piezoelectric layer formed on the lower electrode, and an upper electrode formed on the piezoelectric layer.

In the acceleration sensor in accordance with an aspect of the invention, the piezoelectric layer may be formed from at least one material selected from lead zirconate titanate, lead zirconate titanate niobate, aluminum nitride, and solid solutions of the aforementioned materials In the acceleration sensor in accordance with an aspect of the invention, the insulation layer may be formed from silicon oxide, and the vibration section forming layer may be formed from silicon.

An electronic device in accordance with an embodiment of the invention includes the acceleration sensor described above.

DESCRIPTION OF EXEMPLARY EMBODIMENTS

Preferred embodiments of the present invention are described below with reference to the accompanying drawings. It is noted that the embodiments below are presented for describing examples of the invention.

1. Acceleration Sensor 1000

Figure 1:
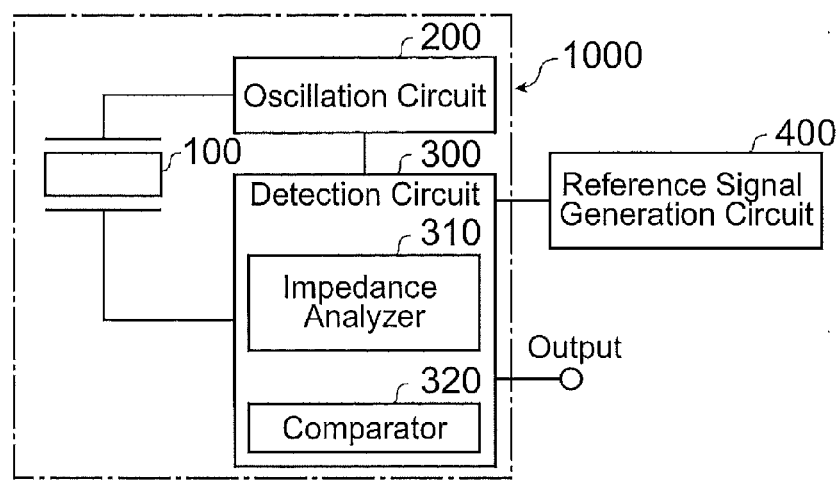
FIG. 1 is a schematic circuit diagram of an acceleration sensor 1000 in accordance with an embodiment of the invention.
Figure 2:
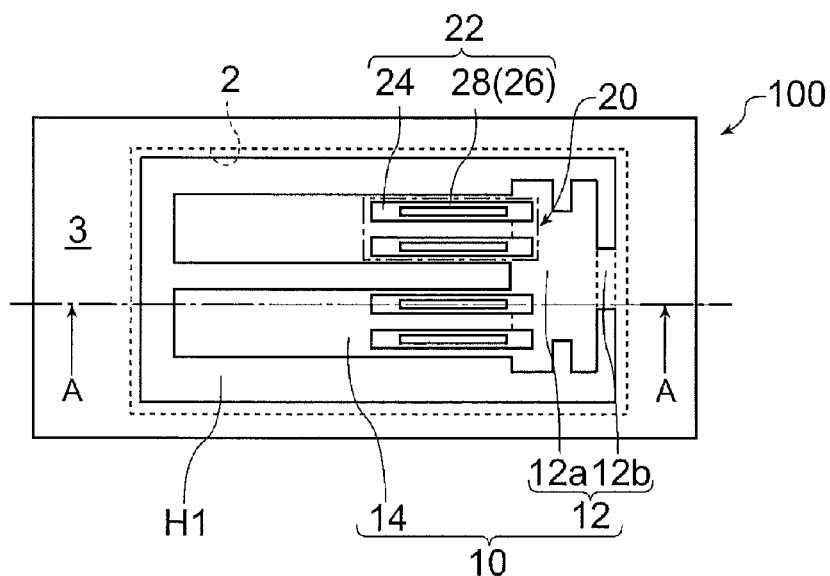
FIG. 2 is a schematic plan view of a piezoelectric vibration device 100 of the acceleration sensor 1000 in accordance with the present embodiment.
Figure 3:
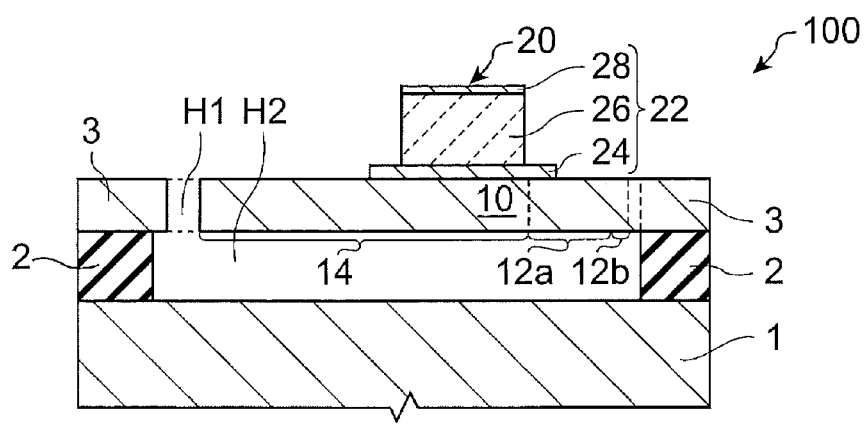
FIG. 3 is a schematic cross-sectional view of the piezoelectric vibration device 100 of the acceleration sensor 1000 in accordance with the present embodiment.

FIG. 1 is a schematic circuit diagram of an acceleration sensor 1000 in accordance with an embodiment of the invention. FIG. 2 is a schematic plan view of a piezoelectric vibration device 100 of the acceleration sensor 1000 in accordance with the present embodiment, and FIG. 3 is a schematic cross-sectional view of the piezoelectric vibration device 100 of the acceleration sensor 1000 in accordance with the present embodiment. FIG. 3 is a cross-sectional view taken along a line A-A of FIG. 2.

The acceleration sensor 1000 in accordance with the present embodiment includes a piezoelectric vibration device 100, an oscillation circuit 200, and a detection circuit 300, as shown in FIG. 1.

The piezoelectric vibration device 100 includes a substrate 1, an insulation layer 2, a vibration section forming layer 3, a first opening section H1, a vibration section 10, a second opening section H2, and a piezoelectric element section 20.

The substrate 1 serves as a base substrate of the piezoelectric vibration device 100, as shown in FIG. 3. The substrate 1 functions as a stopper layer in etching at the time of forming the second opening section H2 to be formed above the substrate 1. As the substrate 1, for example, a silicon substrate, a zirconium substrate, and a gallium arsenide substrate may be used. A variety of semiconductor circuits may be fabricated in the substrate 1. The thickness of the substrate 1 may be 10 μm to 2 mm.

The insulation layer 2 is formed above the substrate 1. The insulation layer 2 may be formed above the substrate 1 with another layer provided between the two layers. The second opening section H2 is formed in the insulation layer 2. Portions of the insulation layer 2 other than the second opening section H2 may function to support at least the vibration section forming layer 3 from below. The second opening section H2 shall be described in detail below. The thickness of the insulation layer 2 may be, for example, 100 nm to 20 μm. The insulation layer 2 may be formed from an oxide material or a nitride material. For example, the insulation layer 2 may be formed from silicon oxide. Also, when the substrate 1 is made of a silicon substrate, the insulation layer 2 may be composed of a silicon oxide layer that may be formed at a surface of the silicon substrate by thermal oxidation or the like.

The vibration section forming layer 3 is formed above the insulation layer 3. The vibration section 10 and the first opening section H1 are formed in the vibration section forming layer 3 (see FIG. 2 and FIG. 3). The vibration section forming layer 3 may be in a single layer structure or a multilayer structure. A portion of the vibration section forming layer 3 becomes to be the vibration section 10. The thickness of the vibration section forming layer 3 may be 1 μm to 20 μm. The vibration section forming layer 3 is formed from a material with an etching rate different from that of the insulation layer 2. The vibration section forming layer 3 may be composed of, for example, silicon, zirconium, aluminum oxide or the like, according to the target frequency, mechanical strength and the like.

The substrate 1, the insulation layer 2 and the vibration section forming layer 3 may be formed individually from one another, but for example, a SOI (silicon on insulator) substrate may be used. In this case, the substrate 1, the insulation layer 2 and the vibration section forming layer 3 correspond to a substrate, a BOX (dielectric) layer and a single crystal silicon layer of the SOI substrate, respectively.

The first opening section H1 penetrates the vibration section forming layer 3. The shape of the first opening section H1 is complementary to the shape of the vibration section 10. In other words, the first opening section H1 and the vibration section 10 are in a relation in which the shape of the vibration section 10 is defined by the shape of the first opening section H1. The first opening section H1 is continuous with the second opening section H2. Therefore, an end section of the cantilever of the vibration section 10 can freely be moved.

The vibration section 10 is formed from a portion of the vibration section forming layer 3. The vibration section 10 is continuous and in one piece with the vibration section forming layer 3. The vibration section 10 is formed in a cantilever shape by the first opening section H1. The thickness of the vibration section 10 is the same as the thickness of the vibration section forming layer 3. The vibration section 10 includes a base section 12 and two beam sections 14 extending from the base section 12. The base section 12 further has a base section 12a and a supporting section 12b. The supporting section 12b serves as a fixed end of the cantilever shaped vibration section 100. The supporting section 12b is continuous in one piece with the base section 12a, and supports the base section 12a. The distance from the boundary between the supporting section 12b and the vibration section forming layer 3 to the boundary between the supporting section 12b and the base section 12a is, for example, 10 μm. The width of the supporting section 12b as viewed in a plan view may be, for example, 30 μm. The distance from the boundary between the base section 12a and the support section 12b to the boundary between the base section 12a and the beam section 14 is, for example, 30 μm. The width of the base section 12a as viewed in a plan view may be, for example, 100 μm. The base section 12a may have a shape with cut sections, as shown in the figure. The supporting section 12b and the base section 12a do not directly participate in operations of the vibration section 10, but function to support the beam section 14. The beam section 14 is formed to include 2 beams extending from the base section 12a. The beam section 14 is a section that carries out vibrational movements of the vibration section 10, and can vibrate in a variety of directions according to specific purposes. For example, the beam section 14 can vibrate in a plane of the vibration section forming layer 3, in other words, a horizontal direction, and vibrate out of a plane of the vibration section forming layer 3, in other words, a longitudinal direction.

The direction of vibration and the shape of the beam section 14 can be designed to have vibration energy loss as small as possible. For example, in the example in FIG. 2, the two beam sections 14 vibrate in a plane of the vibration section forming layer 3 in a manner that the tips of the two beam sections 14 move closer to and away from each other. In other words, in the case of the vibration section 10 in a tuning fork shape according to the example shown in FIG. 2, the turning fork vibrates in a manner that its tips open and close. In this manner, the vibrational energy that may leak out from the supporting section 12b to the vibration section forming layer 3 can be suppressed to a small amount. If the two beam sections 14 vibrate in a vertical direction, in other words, in a normal direction of the vibration section forming layer 3, twisting and warping may be generated in the base section 12a and the supporting section 12b, such that the vibrational energy may dissipate. The vibration section 10 can be designed in consideration of such factors as described above. The vibrational direction and shape of the beam section 14 can be designed according to the purpose of the piezoelectric vibration device 100. Each of the beam sections 14 has a plane configuration that may be, for example, rectangular, triangular or trapezoidal, and is oblong in the example shown in FIG. 2. The length of each of the beam sections 14 is, for example, 100 µm to 400 µm. The width of each of the beam sections 14 is, for example, 30 µm. It is noted that the length of each of the beam sections 14 may be a distance from the free end of the beam section 14 and the boundary between the beam section 14 and the base section 12a, in a plan view.

It is noted that the length of each of the members described above means the length of the vibration section 10 formed in a cantilever shape in its lengthwise direction (X direction), and the width of each of the members means a distance between two ends of the member in a direction (Y direction) orthogonal to the lengthwise direction of the vibration section 10 formed in a cantilever shape.

The second opening section H2 is provided in a manner to penetrate the insulation layer 2. The second opening section H2 is continuous with the first opening section H1. The second opening section H2 is formed below the first opening section H1 and the vibration section 10. The lower surface of the second opening section H2 is defined by the substrate 1. The second opening section H2 is a space in which the vibration section 10 can operates. In a plan view, the contour of the second opening section H2 may be inside the contour of the first opening section H1 if it is outside the contour of the beam section 14 of the vibration section 10 and the base section 12a. The second opening section H2 may be provided in a manner to extend below the end section of the vibration section forming layer 3. The second opening section H2 has a plane configuration that is, for example, rectangular, and is oblong in the illustrated example.

The piezoelectric element section 20 is formed above the beam section 14. The piezoelectric element section 20 may be formed at any arbitrary position as long as the piezoelectric element section 20 at that position can induce vibration in the beam section 14. The piezoelectric element section 20 is equipped with a piezoelectric element 22. The piezoelectric element section 20 may be equipped with a plurality of piezoelectric elements 22. The piezoelectric element section 20 functions to vibrate the beam section 14 by operation of the piezoelectric element 22. In the example shown in FIG. 2 and FIG. 3, the piezoelectric elements 22 in a pair are provided in a region of each of the beam sections 14 on the side of the base section 12a, in parallel with each other through the center line of each of the respective beam sections 14. The piezoelectric elements 22 in this example are operated such that, when one of the beam sections 14 extends in its lengthwise direction, the other contracts, whereby the beam sections 14 can vibrate in a plane of the vibration section forming layer 3. Furthermore, when the piezoelectric element section 20 is equipped with a plurality of piezoelectric elements 22, the piezoelectric elements 22 may be provided to achieve different functions, for example, for vibrating the beam section 14 and for detecting a difference in the direction of vibration and the number of vibration frequency of the beam section 14, respectively. Electrodes for all of the piezoelectric elements 22 are electrically connected to an external circuit by wirings (not shown).

Each of the piezoelectric elements 22 has a plane configuration that is, for example, rectangular, and is oblong in the illustrated example, and its lengthwise direction is the same (X direction) as the lengthwise direction of the vibration section 10. The piezoelectric elements 22 are formed on the beam sections 14, for example, on the base side thereof, as shown in FIG. 2 and FIG. 3. Each of the piezoelectric elements 22 may be provided in a manner that, for example, one end thereof in its lengthwise direction (X direction) is flush with the boundary between the beam section 14 and the base section 12a of the beam section 14. It is noted that, although not shown, a portion of the piezoelectric element 22 may be formed, for example, on the base section 12a. The length of the piezoelectric element 22 may be, for example, 50 µm, and the width of the piezoelectric element 22 may be, for example, 10 µm.

Each of the piezoelectric elements 22 has a laminate structure of a lower electrode 24, a piezoelectric layer 26 and an upper electrode 28.

The lower electrode 24 is formed above the beam section 14. The lower electrode 24 may be formed with a layer that serves as a base between the lower electrode 24 and the beam section 14. The lower electrode 24 may have a portion extending out of the lower surface of the piezoelectric layer 26. The lower electrode 24 may be composed of metal material, such as, for example, platinum, or conductive oxide, such as, complex oxide of lithium and nickel, or the like, and may be formed in a single layer or a multilayer structure. The thickness of the lower electrode 24 may be such that a sufficiently low electrical resistance value can be obtained, and for example, may be 10 nm to 5 µm.

The piezoelectric layer 26 has piezoelectric property, and is capable of extending and contracting when a voltage is applied to the piezoelectric layer 26 across the lower electrode 24 and the upper electrode 28, whereby the beam section 14 therebelow can be operated. In reverse, the piezoelectric layer 26 can generate a voltage between the lower electrode 24 and the upper electrode 28 when it is extended or contracted, whereby a voltage for detecting the operation of the beam section 14 therebelow can be generated. The direction of extension and contraction of the piezoelectric layer 26 may be appropriately arranged according to the direction of vibration of the beam section 14. One of the methods to accomplish the above, for example, crystals of the material composing the piezoelectric layer 26 may be set to a specified orientation according to specific purposes. The piezoelectric layer 26 may be formed from at least one material selected from lead zirconate titanate (Pb (Zr, Ti) $O_3$:PZT), aluminum nitride, and solid solutions of the aforementioned materials. For example, the piezoelectric layer 26 may be formed from lead zirconate titanate niobate (Pb (Zr, Ti, Nb) $O_3$:PZTN), which is lead zirconate titanate solid solution. The thickness of the piezoelectric layer 26 may be, for example, 10 nm to 20 µm.

The upper electrode 28 may be composed of metal material, such as, for example, platinum, or conductive oxide, such as, complex oxide of lithium and nickel, or the like, and may be formed in a single layer or a multilayer structure. The thickness of the upper electrode 28 may be such that a sufficiently low electrical resistance value can be obtained, and for example, may be 10 nm to 5 μm. The thickness within this range can secure a driving force that sufficiently vibrates the beam section 14. For example, when the thickness of the vibration section 10 is 1 μm to 4 μm, the thickness of the piezoelectric layer 26 may be 0.1 μm to 5 μm. The film thickness of the piezoelectric layer 26 may be appropriately changed according to the resonance condition.

Figure 4:
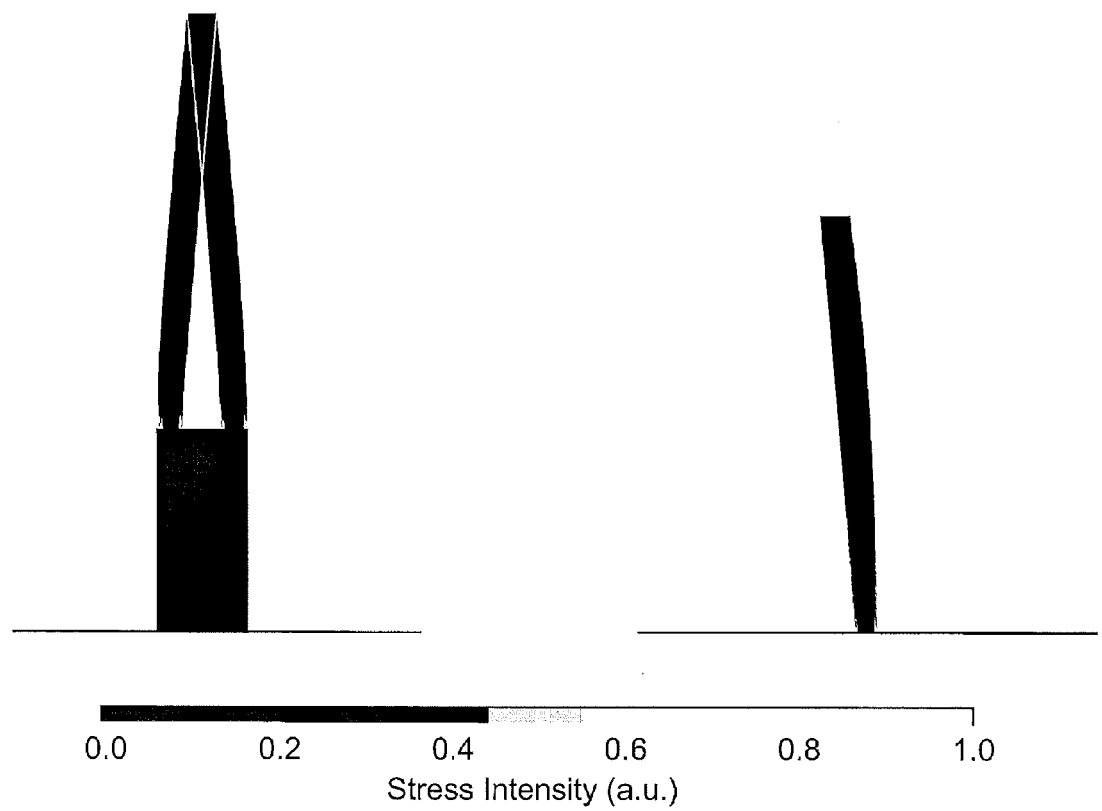
FIG. 4 shows simulation results of stress in the piezoelectric vibration device in a resonance mode.

Also, according to the piezoelectric vibration device 100 in accordance with the present embodiment, stress does not concentrate in a connection section between the vibration section 10 and the vibration section forming layer 3 such that the loss of vibration energy is small, and a high Q value can be obtained. FIG. 4 shows a result of simulation of stress in the piezoelectric vibration device 100 in a resonance mode (on the left side in the figure). The figure shows the tip sections of the beam 14 overlapped each other. However, it is noted that they overlap each other on calculation thereby clearly showing differences in the intensity of stress, and such interference does not actually take place. FIG. 4 also shows a result of simulation of stress in a unimorph type piezoelectric vibration device (on the right side in the figure) having a vibration section composed of one beam. The unit of stress intensity shown in FIG. 4 is a normalized arbitrary unit (a.u.). As shown in FIG. 4, it is observed that the stress at the connection section between the vibration section 10 and the vibration section forming layer 3 in the piezoelectric vibration device 100 in accordance with the present embodiment is considerably smaller than the stress at the connection section between the vibration section and the base substrate in the unimorph type piezoelectric vibration device. The above is believed to be caused by the following reason. As described above, in the tuning fork type piezoelectric vibration device 100, the two beam sections 14 are formed symmetrical with each other, and the two beam sections 14 vibrate in a manner to open and close. As a result, it is believed that stresses applied to the base section 12a are mutually offset, and therefore the stress applied adjacent to the supporting section 12b becomes smaller.

According to the acceleration sensor 100 in accordance with the present embodiment, by applying an electric field to the pairs of piezoelectric elements 22 above the beam sections 14 to cause extension and contraction in mutually opposite directions in the beam sections 14, the above-described vibration that causes the tips of the beam sections 14 to move closer to and away from each other can be exited. When acceleration is applied in the direction in which the beam sections 14 extend, the number of vibration frequency of the vibration changes.

The resonance frequency of the piezoelectric vibration device 100 in accordance with the present embodiment may preferably be 100 kHz or less. This is because the power for the driver oscillation circuit can be small, and the resonance frequencies in a 32 kHz band are oscillation frequencies for general purposes. Resonance frequencies lower than 100 kHz can be obtained by, for example, changing the design of a 32 kHz driving circuit. It is noted that the resonance frequency in the 32 kHz band may be, for example, in the range of 16.384 kHz to 65.536 kHz. By adding a divider circuit to a 32.768 kHz ($2^{15}$ Hz: also simply referred to as "32 kHz") oscillator circuit, the piezoelectric vibration device 100 can be driven at 16.384 kHz ($2^{14}$ Hz), and the piezoelectric vibration device 100 can be driven at 65.536 kHz ($2^{16}$ Hz) by adding a phase locked loop to a 32 kHz oscillator circuit.

Next, an acceleration sensor 1000 in accordance with an embodiment of the invention is described.

The acceleration sensor 1000 in accordance with the present embodiment includes the piezoelectric vibration device 100 described above, an oscillation circuit 200 for oscillating the piezoelectric vibration device 100, and a detection circuit 300 for detecting vibration of the piezoelectric vibration device 100, as shown in FIG. 1. Furthermore, the acceleration sensor 1000 may have, for example, a peripheral circuit (not shown). The peripheral circuit may be fabricated in, for example, the vibration section forming layer 3 (see FIG. 2).

The oscillation circuit 200 is connected to the piezoelectric elements 22 of the piezoelectric vibration device 100 through the detection circuit 300, as shown in FIG. 1. The oscillation circuit 200 operates the piezoelectric elements 22 to be oscillated at the resonance frequency of the piezoelectric vibration device 100. In the oscillation state created by the oscillation circuit 200, the beam sections 14 vibrate at the resonance frequency.

The detection circuit 300 includes, for example, as shown in FIG. 1, an impedance analyzer 310 and a comparator 320, and is connected to the piezoelectric vibration device 100 and the oscillation circuit 200. The detection circuit 300 can detect, by the impedance analyzer 310, the frequency of vibration of the piezoelectric vibration device 100. Also, the detection circuit 300 can compare, by the comparator 320, the frequency of vibration of the piezoelectric vibration device 100 with a reference signal generated by a reference signal generation circuit 400. The impedance analyzer 310 may be formed from, for example, a time measurement circuit. As the reference signal of the reference signal generation circuit 400, for example, a signal having the same number of vibration frequency as the resonance frequency of the oscillation circuit may be selected.

When acceleration is applied to the beam sections 14 that are vibrating at the resonance frequency, the beam sections 14 vibrate at a frequency different from the resonance frequency. This frequency is detected by the detection circuit 300, and compared with a reference signal generated by the reference signal generation circuit 400, whereby a signal corresponding to the applied acceleration is outputted. In this manner, the acceleration sensor 1000 outputs signals according to acceleration applied.

2. Method for Manufacturing Acceleration Sensor 1000

Figure 5:
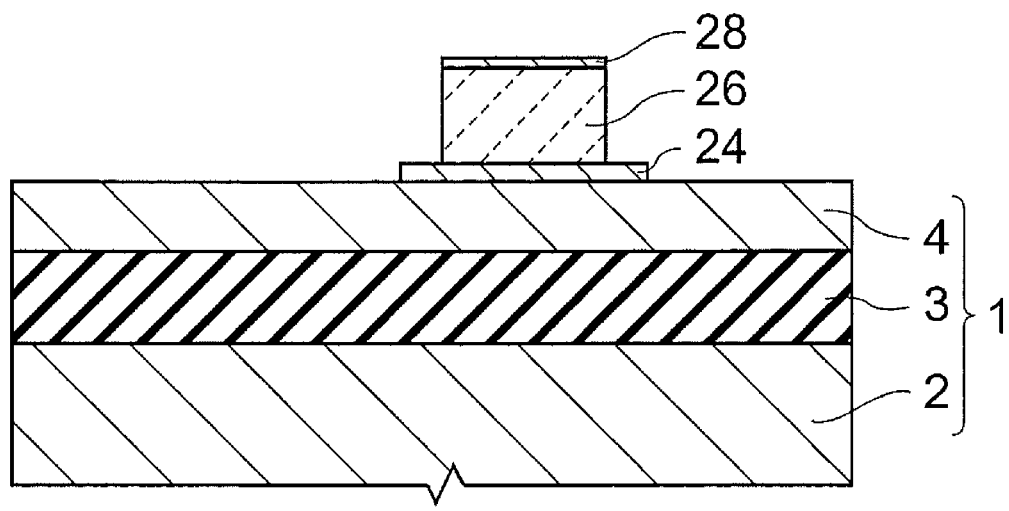
FIG. 5 is a cross-sectional view schematically showing a step of a method for manufacturing an acceleration sensor in accordance with an embodiment of the invention.
Figure 6:
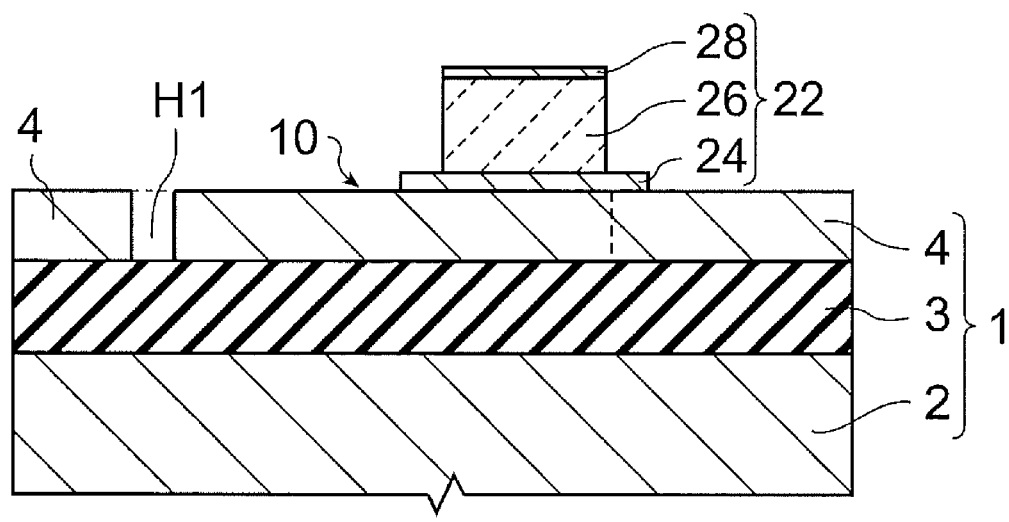
FIG. 6 is a cross-sectional view schematically showing a step of the method for manufacturing an acceleration sensor in accordance with the embodiment of the invention.

First, an example of a method for manufacturing a piezoelectric vibration device 100 in accordance with an embodiment of the invention is described with reference to the accompanying drawings. FIGS. 5 and 6 are schematic cross-sectional views showing steps in the method for manufacturing the piezoelectric vibration device 100, and correspond to the cross-sectional view shown in FIG. 3, respectively.

First, as shown in FIG. 5, an insulation layer 2 and a vibration section forming layer 3 are formed on a substrate 1 in this order. Instead of conducting this step, for example, a SOI substrate in which a silicon oxide layer and a silicon layer are laminated on a silicon substrate in this order may be prepared. In this step, the insulation layer 2 may be formed by a thermal oxidation method, a CVD (chemical vapor deposition) method, a sputter method or the like, and the vibration section forming layer 3 may be formed by a CVD method, a sputter method or the like.

Then, as shown in FIG. 5, a piezoelectric element section 20 is formed above the vibration section forming layer 3. Layers for an electrode 24, a piezoelectric layer 26 and an upper electrode are laminated above the vibration section forming layer 3, and the laminated layers are patterned to form piezoelectric elements 22 using photolithography and etching technique. A base layer may be formed between the vibration section forming layer 3 and the lower electrode 24. The layer that becomes the lower electrode 24 is formed by a vapor deposition method, a sputter method or the like. The layer that becomes the piezoelectric layer 26 is formed by a solution method (sol-gel method), a laser ablation method, a vapor deposition method, a sputter method, a CVD method or the like. The layer that becomes the upper electrode 28 is formed by a vapor deposition method, a sputter method, a CVD method or the like.

By the steps described above, the piezoelectric element section 20 having the piezoelectric elements 22 each having the lower electrode 24, the piezoelectric layer 26 and the upper electrode 28 is formed. If a base layer or the like is provided, the base layer can be further patterned into a desired shape. The patterning may be performed using, for example, lithography technique and etching technique. It is noted that the lower electrode layer 24, the piezoelectric layer 26 and the upper electrode 28 may be patterned individually upon forming each of the layers, or may be patterned upon forming each set of plural layers.

Next, the vibration section forming layer 3 is patterned into a desired shape, thereby forming a vibration section 10 and a first opening section H1, as shown in FIG. 6. The vibration section 10 can be obtained by forming the first opening section H1 that penetrates the vibration section forming layer 3 and exposes the insulation layer 2. The vibration section forming layer 3 may be patterned, for example, using lithography and etching technique. As the etching technique, for example, a dry etching method or a wet etching method may be used. In this etching step, the insulation layer 2 can be used as an etching stopper layer. In other words, when etching the vibration section forming layer 3, the etching rate of the insulation layer 2 is lower than the etching rate of the vibration section forming layer 3.

Next, a part of the insulation layer 2 is removed through the potion exposed by the first opening section H1, whereby a second opening section H2 is formed below the vibration section 10 and the first opening section H1, as shown in FIG. 2 and FIG. 3. The second opening section H2 is formed at a position where the vibration section 10 can vibrate in a state in which mechanical restraining force against the free ends of the vibration section 10 does not exist. The second opening section H2 may be formed, for example, below the end section of the vibration section forming layer 3. When the insulation layer 2 is composed of silicon oxide, the insulation layer 2 can be removed by, for example, a wet etching method using hydrofluoric acid. In this etching step, the vibration section 10 and the vibration section forming layer 3 can be used as a mask, and the substrate 1 can be used as an etching stopper layer. In other words, when etching the insulation layer 2, the etching rate of the vibration section 10, the vibration section forming layer 3 and the substrate 1 is lower than the etching rate of the insulation layer 2.

By the steps described above, the first opening section H1 and the second opening section H2 are provided, whereby the mechanical restraining force on the free ends of the vibration section 10 is eliminated, and the vibration section 10 can sufficiently vibrate. By the steps described above, as shown in FIG. 2 and FIG. 3, the piezoelectric vibration device 100 for an acceleration sensor 1000 in accordance with the present embodiment is formed.

The acceleration sensor 1000 in accordance with the present embodiment is manufactured through wiring the piezoelectric vibration device 100 manufactured in a manner described above with an oscillation circuit 200 and a detection circuit 300 shown in FIG. 1. An independent IC (integrated circuit) chip that includes the oscillation circuit 200 and the detection circuit 300 fabricated therein may be provided, or these circuits may be formed in the substrate 1 or the vibration section forming layer 3 of the piezoelectric vibration device 100 and wired.

In this manner, the acceleration sensor 1000 is manufactured.

According to the acceleration sensor 1000 in accordance with the present embodiment, the resonance frequency of the piezoelectric vibration device 100 depends on the width of the beam of the vibration section 10. Therefore, according to the piezoelectric vibration device 100, its resonance frequency can be adjusted by adjusting the width of the beam without making the vibration section 10 longer. Therefore, a further size reduction can be achieved, and driving at a desired resonance frequency (for example, at several tens kHz) can be performed. Also, according to the piezoelectric vibration device 100 of the acceleration sensor 1000, stress does not concentrate in a boundary section between the vibration section 10 and the vibration section forming layer 3 (more specifically, at the fixed end of the vibration section 10), such that a high Q value can be obtained.

The embodiments of the invention are described above in detail. However, those skilled in the art should readily understand that many modifications can be made without departing in substance from the novel matter and effects of the invention. Accordingly, those modified examples are also deemed included in the scope of the invention.

For example, the acceleration sensor 1000 in accordance with the embodiment of the invention described above is also applicable to information equipment such as, digital cameras, hard disks, and the like, and on automotive equipment, such as, antilock brakes, air-bag systems and the like.

What is claimed is:
1. An acceleration sensor comprising:
a piezoelectric vibration device;
an oscillation circuit; and
a detection circuit,
wherein
the piezoelectric vibration device includes a substrate, an insulation layer formed above the substrate, a vibration section forming layer formed above the insulation layer, a vibration section formed in a cantilever shape in a first opening section that penetrates the vibration section forming layer and having a base section affixed to the vibration section forming layer and two beam sections extending from the base section, a second opening section that penetrates the insulation layer and formed below the first opening section and the vibration section, and a piezoelectric element section formed on each of the beam sections, the piezoelectric element section including a lower electrode, a piezoelectric layer formed on the lower electrode, and an upper electrode formed on the piezoelectric layer, the lower electrode having a larger area than an area of the piezoelectric layer, extending in a first direction toward the first opening section to a greater extent than the piezoelectric layer and the upper electrode, and extending in a second direction, opposite the first direction, to a greater extent than the piezoelectric layer and the upper electrode,
the oscillation circuit vibrates the piezoelectric vibration device at a resonance frequency, and
the detection circuit detects a change in the frequency of vibrations of the piezoelectric vibration device which is caused by an acceleration applied in a direction in which the beam sections extend, and outputs a signal corresponding to the acceleration based on the change in the frequency.

2. An acceleration sensor according to claim 1, wherein the piezoelectric layer is formed from at least one of lead zirconate titanate, aluminum nitride, solid solution of lead zirconate titanate and solid solution of aluminum nitride.

3. An acceleration sensor according to claim 1, wherein the insulation layer is formed from silicon oxide, and the vibration section forming layer is formed from silicon.

4. An electronic device comprising the acceleration sensor recited in claim 1.

* * * * *